(12) United States Patent
Kikuchi et al.

(10) Patent No.: US 8,384,860 B2
(45) Date of Patent: Feb. 26, 2013

(54) LIQUID CRYSTAL DISPLAY DEVICE AND METHOD OF MANUFACTURING LIQUID CRYSTAL DISPLAY DEVICE

(75) Inventors: Tetsuo Kikuchi, Osaka (JP); Hideki Kitagawa, Osaka (JP); Hajime Imai, Osaka (JP); Yoshihito Hara, Osaka (JP); Mitsunori Imade, Osaka (JP); Junya Shimada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 455 days.

(21) Appl. No.: 12/666,461

(22) PCT Filed: May 29, 2008

(86) PCT No.: PCT/JP2008/001353
§ 371 (c)(1),
(2), (4) Date: Dec. 23, 2009

(87) PCT Pub. No.: WO2009/001508
PCT Pub. Date: Dec. 31, 2008

(65) Prior Publication Data
US 2010/0182527 A1    Jul. 22, 2010

(30) Foreign Application Priority Data
Jun. 26, 2007    (JP) .................................. 2007-167921

(51) Int. Cl.
*G02F 1/1335*    (2006.01)
(52) U.S. Cl. ........................................ 349/113; 349/114
(58) Field of Classification Search .................... None
See application file for complete search history.

(56) References Cited

U.S. PATENT DOCUMENTS

| | | | |
|---|---|---|---|
| 4,345,249 | A | 8/1982 | Togashi |
| 4,519,678 | A | 5/1985 | Komatsubara et al. |
| 5,408,345 | A | 4/1995 | Mitsui et al. |
| 5,418,635 | A | 5/1995 | Mitsui et al. |
| 5,508,834 | A | 4/1996 | Yamada et al. |
| 5,811,835 | A | 9/1998 | Seiki et al. |
| 6,104,460 | A | 8/2000 | Abe et al. |
| 6,208,395 | B1 | 3/2001 | Kanoh et al. |
| 6,255,706 | B1 | 7/2001 | Watanabe et al. |
| 6,287,899 | B1 | 9/2001 | Park et al. |
| 6,330,047 | B1 | 12/2001 | Kubo et al. |
| 6,407,784 | B1 | 6/2002 | Kamou et al. |

(Continued)

FOREIGN PATENT DOCUMENTS

| | | |
|---|---|---|
| EP | 1 744 204 A1 | 1/2007 |
| JP | 63-296004 | 12/1988 |

(Continued)

OTHER PUBLICATIONS

International Preliminary Report on Patentability mailed Jan. 21, 2010 in corresponding PCT Application No. PCT/JP2008/001353.

(Continued)

*Primary Examiner* — Thanh-Nhan P Nguyen
(74) *Attorney, Agent, or Firm* — Nixon & Vanderhye P.C.

(57) ABSTRACT

A liquid crystal display device has a plurality of pixels and a reflection section for reflecting incident light toward a display surface. The reflection section includes a metal layer having a plurality of apertures, and a reflective layer formed on the metal layer with an insulating layer interposed therebetween. A surface of the reflective layer includes a plurality of recesses or protrusions formed in accordance with a cross-sectional shape of the metal layer.

17 Claims, 9 Drawing Sheets

U.S. PATENT DOCUMENTS

| | | | |
|---|---|---|---|
| 6,468,822 B2 | 10/2002 | Maeda et al. |
| 6,573,127 B2 | 6/2003 | Seo |
| 6,661,488 B1 | 12/2003 | Takeda et al. |
| 6,710,825 B2 | 3/2004 | Kubo et al. |
| 6,747,289 B2 | 6/2004 | Yamazaki et al. |
| 6,771,346 B2 | 8/2004 | Sugimoto et al. |
| 6,839,107 B2 | 1/2005 | Kobashi |
| 6,839,108 B1 | 1/2005 | Hirakata et al. |
| 6,873,384 B2 | 3/2005 | Yamanaka et al. |
| 6,891,586 B2 | 5/2005 | Anno et al. |
| 6,900,084 B1 | 5/2005 | Yamazaki |
| 6,967,702 B2 | 11/2005 | Ishii et al. |
| 6,992,718 B1 | 1/2006 | Takahara |
| 7,102,712 B2 | 9/2006 | Anno et al. |
| 7,375,781 B2 | 5/2008 | Kubo |
| 7,525,614 B2 | 4/2009 | Jeong et al. |
| 7,554,631 B2 | 6/2009 | Tashiro et al. |
| 7,768,603 B2 | 8/2010 | Tasaka et al. |
| 7,995,167 B2 | 8/2011 | Imade et al. |
| 8,243,236 B2 | 8/2012 | Hara et al. |
| 2002/0018161 A1 | 2/2002 | Yamanaka et al. |
| 2002/0022364 A1 | 2/2002 | Hatta et al. |
| 2002/0054259 A1 | 5/2002 | Funahata et al. |
| 2002/0054269 A1 | 5/2002 | Maeda et al. |
| 2002/0080320 A1 | 6/2002 | Suzuki et al. |
| 2002/0149728 A1 | 10/2002 | Ogishima et al. |
| 2003/0089949 A1 | 5/2003 | Lin et al. |
| 2003/0112213 A1 | 6/2003 | Noguchi et al. |
| 2003/0123005 A1 | 7/2003 | Liu et al. |
| 2003/0142255 A1 | 7/2003 | Ishii et al. |
| 2003/0186478 A1 | 10/2003 | Morita et al. |
| 2003/0218664 A1 | 11/2003 | Sakamoto et al. |
| 2003/0231267 A1 | 12/2003 | Murai et al. |
| 2004/0021810 A1 | 2/2004 | Kawaguri et al. |
| 2004/0027702 A1 | 2/2004 | Matsushita et al. |
| 2004/0070714 A1 | 4/2004 | Ishii et al. |
| 2005/0122452 A1 | 6/2005 | Yoshida et al. |
| 2005/0190322 A1 | 9/2005 | Okabe et al. |
| 2005/0205870 A1 | 9/2005 | Yamazaki |
| 2005/0270447 A1 | 12/2005 | Tasaka et al. |
| 2006/0055852 A1 | 3/2006 | Yoshida et al. |
| 2006/0139526 A1 | 6/2006 | Ahn et al. |
| 2007/0001171 A1 | 1/2007 | Yamazaki |
| 2007/0146591 A1 | 6/2007 | Kimura et al. |
| 2007/0291200 A1 | 12/2007 | Tashiro et al. |
| 2008/0002079 A1 | 1/2008 | Kimura |
| 2009/0185119 A1 | 7/2009 | Kikuchi et al. |
| 2009/0195740 A1 | 8/2009 | Imai et al. |
| 2009/0195741 A1 | 8/2009 | Hara et al. |
| 2010/0045885 A1 | 2/2010 | Imai et al. |
| 2010/0053517 A1 | 3/2010 | Imai et al. |
| 2010/0118238 A1 | 5/2010 | Shimada et al. |
| 2010/0182527 A1 | 7/2010 | Kikuchi et al. |
| 2010/0315578 A1 | 12/2010 | Hara et al. |
| 2010/0321618 A1 | 12/2010 | Imai et al. |

FOREIGN PATENT DOCUMENTS

| | | |
|---|---|---|
| JP | 02-149802 | 6/1990 |
| JP | 4-372934 | 12/1992 |
| JP | 5-333328 | 12/1993 |
| JP | 6-331831 | 12/1994 |
| JP | 8-190089 | 7/1996 |
| JP | 9-54318 | 2/1997 |
| JP | 10-325953 | 12/1998 |
| JP | 11-109390 | 4/1999 |
| JP | 11-237625 A | 8/1999 |
| JP | 11-295697 | 10/1999 |
| JP | 11-337961 | 12/1999 |
| JP | 2000-010124 | 1/2000 |
| JP | 2000-208773 A | 7/2000 |
| JP | 2000-329906 | 11/2000 |
| JP | 2001-201619 | 7/2001 |
| JP | 2001-337323 | 12/2001 |
| JP | 2002-236283 | 8/2002 |
| JP | 2003-297850 | 10/2003 |
| JP | 2004-258366 | 9/2004 |
| JP | 2004-264653 | 9/2004 |
| JP | 2004-325503 | 11/2004 |
| JP | 2005-157105 A | 6/2005 |
| JP | 2005-195733 | 7/2005 |
| JP | 2005-208553 | 8/2005 |
| JP | 2005-313638 | 11/2005 |
| JP | 2006-098525 A | 4/2006 |
| JP | 2006-184673 | 7/2006 |
| JP | 2006-220711 | 8/2006 |
| JP | 2006-220922 | 8/2006 |
| JP | 2007-101843 | 4/2007 |
| JP | 2007-329099 | 12/2007 |
| JP | 2008-242307 A | 10/2008 |

OTHER PUBLICATIONS

English translation of the International Preliminary Report on Patentability mailed Aug. 13, 2009 in PCT Application No. PCT/JP2007/073787.

U.S. Notice of Allowance mailed Mar. 23, 2011 in U.S. Appl. No. 12/446,099.

International Search Report for PCT/JP2007/070160, mailed Nov. 27, 2007.

Supplementary EP Search Report mailed Sep. 23, 2010 in EP application 07806943.2.

U.S. Office Action mailed Aug. 3, 2011 in U.S. Appl. No. 12/446,071.

International Search Report for PCT/JP2007/067511, mailed Oct. 9, 2007.

International Search Report for PCT/JP2007/073557, mailed Jan. 15, 2008.

English translation of the International Preliminary Report on Patentability mailed Jun. 25, 2009 in PCT Application No. PCT/JP2007/070829.

U.S. Office Action mailed Aug. 5, 2011 in U.S. Appl. No. 12/518,719.

Restriction Requirement mailed Jun. 2, 2011 in U.S. Appl. No. 12/518,719.

English translation of the International Preliminary Report on Patentability mailed Aug. 6, 2009 in PCT Application No. PCT/JP2007/073557.

International Search Report mailed Apr. 8, 2008 in PCT application PCT/JP/2007/075147.

English translation of International Preliminary Report on Patentability mailed Apr. 30, 2009 in corresponding PCT Application No. PCT/JP2007/070160.

English translation of International Preliminary Report on Patentability mailed Apr. 30, 2009 in corresponding PCT Application No. PCT/JP2007/067511.

English International Preliminary Report on Patentability mailed Oct. 22, 2009 in PCT Application No. PCT/JP2007/075147.

Supplementary EP Search Report mailed Dec. 17, 2010 in EP application 07860369.3.

Supplementary EP Search Report mailed Mar. 3, 2010 in EP application 07850173.1.

English International Preliminary Report on Patentability mailed Nov. 27, 2008 in PCT Application No. PCT/JP2007/057674.

International Search Report mailed Jan. 29, 2008 in PCT application PCT/JP2007/073787.

International Search Report mailed Jul. 3, 2007 in PCT application PCT/JP2007/057674.

International Search Report mailed Jul. 3, 2007 in PCT application PCT/JP2007/057675.

English International Preliminary Report on Patentability mailed Nov. 27, 2008 in PCT Application No. PCT/JP2007/057675.

International Search Report for PCT/JP2007/070829, mailed Nov. 27, 2007.

U.S. Office Action mailed Dec. 7, 2011 in U.S. Appl. No. 12/306,959.

U.S. Office Action mailed Dec. 27, 2011 in U.S. Appl. No. 12/524,914.

U.S. Final Office Action mailed Jan. 9, 2012 in U.S. Appl. No. 12/446,071.
International Search Report for PCT/JP2008/001353, mailed Jul. 8, 2008.
U.S. Appl. No. 12/446,071, Hara, filed Apr. 17, 2009.
U.S. Appl. No. 12/446,099, Imade, filed Apr. 17, 2009.
U.S. Appl. No. 12/518,719, Kikuchi, filed Jun. 11, 2009.
U.S. Appl. No. 12/523,935, Imai, filed Jul. 21, 2009.
U.S. Appl. No. 12/524,914, Shimada, filed Jul. 29, 2009.
U.S. Appl. No. 12/595,782, Imai, filed Oct. 13, 2009.

(a)

(b)

(a)

(b)

(c)

(a)

(b)

LIQUID CRYSTAL DISPLAY DEVICE AND METHOD OF MANUFACTURING LIQUID CRYSTAL DISPLAY DEVICE

This application is the U.S. national phase of International Application No. PCT/JP2008/001353, filed 29 May 2008, which designated the U.S. and claims priority to Japanese Patent Application No. 2007-167921, filed 26 Jun. 2007, the entire contents of each of which are hereby incorporated by reference.

TECHNICAL FIELD

The present invention relates to a reflection-type or transflective-type liquid crystal display device capable of performing display by utilizing reflected light.

BACKGROUND ART

Liquid crystal display devices (LCDs) include the transmission-type liquid crystal display device which utilizes backlight from behind the display panel as a light source for displaying, the reflection-type liquid crystal display device which utilizes reflected light of external light, and the transflective-type liquid crystal display device (reflection/transmission-type liquid crystal display device) which utilizes both reflected light of external light and backlight. The reflection-type liquid crystal display device and the transflective-type liquid crystal display device are characterized in that they have smaller power consumptions than that of the transmission-type liquid crystal display device, and their displayed images are easy to see in a bright place. The transflective-type liquid crystal display device is characterized in that its screen is easier to see than that of the reflection-type liquid crystal display device, even in a dark place.

FIG. 11 is a cross-sectional view showing an active matrix substrate 100 of a conventional reflection-type liquid crystal display device (e.g., Patent Document 1).

As shown in this figure, the active matrix substrate 100 includes an insulative substrate 101, as well as a gate layer 102, a gate insulating layer 104, a semiconductor layer 106, a metal layer 108, and a reflective layer 110, which are stacked on the insulative substrate 101. After being stacked on the insulative substrate 101, the gate layer 102, the gate insulating layer 104, the semiconductor layer 106, and the metal layer 108 are etched by using one mask, thus being formed so as to have an island-like multilayer structure. Thereafter, the reflective layer 110 is formed on this multilayer structure, whereby a reflection surface 112 having ruggednesses is formed. Although not shown, transparent electrodes, a liquid crystal panel, a color filter substrate (CF substrate), and the like are formed above the active matrix substrate 100.

FIG. 12 is a cross-sectional view of a conventional transflective-type liquid crystal display device (e.g., Patent Document 2).

As shown in the figure, in this conventional transflective-type liquid crystal display device, an interlayer insulating film 204 is formed on a drain electrode 222 of a switching element (TFT) 203, and a galvanic corrosion preventing film 205, a reflection electrode film 206, and an amorphous transparent electrode film 218 are stacked on the interlayer insulating film 204. The region where the reflection electrode film 206 is formed is a reflection region of the transflective-type liquid crystal display device. Ruggednesses are formed in an upper portion of the interlayer insulating film 204 within the reflection region, and conforming to these ruggednesses, ruggednesses are also formed on the galvanic corrosion preventing film 205, the reflection electrode film 206, and the amorphous transparent electrode film 218.

[Patent Document 1] Japanese Laid-Open Patent Publication No. 9-54318

[Patent Document 2] Japanese Laid-Open Patent Publication No. 2005-277402

DISCLOSURE OF INVENTION

Problems to be Solved by the Invention

In the active matrix substrate 100 described in Patent Document 1, portions of the reflective layer 110 are formed so as to reach the insulative substrate 101 in portions where the gate layer 102 and the like are not formed (i.e., portions between islands, hereinafter referred to as "gap portions"). Therefore, in the gap portions, the surface of the reflection surface 112 is recessed in the direction of the insulative substrate 101, thus forming a plane having deep dents (or recesses).

In the reflection-type liquid crystal display device or the transflective-type liquid crystal display device, in order to perform bright displaying with a wide viewing angle, it is necessary to allow incident light entering the display device to be more uniformly and efficiently reflected by the reflection surface 112 across the entire display surface, without causing specular reflection in one direction. For this purpose, it is better if the reflection surface 112 has moderate ruggednesses rather than being a complete plane.

However, the reflection surface 112 of the aforementioned active matrix substrate 100 has deep dents. Therefore, light is unlikely to reach the reflection surface located in lower portions of the dents, and even if at all light reaches there, the reflected light thereof is unlikely to be reflected toward the liquid crystal panel, thus resulting in a problem in that the reflected light is not effectively utilized for displaying. Furthermore, many portions of the reflection surface 112 have a large angle with respect to the display surface of the liquid crystal display device, thus resulting in a problem in that the reflected light from these portions is not effectively utilized for displaying.

FIG. 13 is a diagram showing a relationship between the tilt of the reflection surface 112 and the outgoing angle of reflected light. FIG. 13(a) shows a relationship between an incident angle $\alpha$ and an outgoing angle $\beta$ when light enters a medium b having a refractive index Nb from a medium a having an refractive index Na. In this case, according to Snell's Law, the following relationship holds true.

$$Na \times \sin\alpha = Nb \times \sin\beta$$

FIG. 13(b) is a diagram showing a relationship between incident light and reflected light when incident light perpendicularly entering the display surface of a liquid crystal display device is reflected from a reflection surface which is tilted by $\theta$ with respect to the display surface (or the substrate). As shown in the figure, the incident light perpendicularly entering the display surface is reflected from the reflection surface which is tilted by angle $\theta$ with respect to the display surface, and goes out in a direction of an outgoing angle $\phi$.

Results of calculating the outgoing angle $\phi$ according to Snell's Law with respect to each angle $\theta$ of the reflection surface are shown in Table 1.

TABLE 1

| θ | φ | 90 − φ |
|---|---|---|
| 0 | 0 | 90 |
| 2 | 6.006121 | 83.99388 |
| 4 | 12.04967 | 77.95033 |
| 6 | 18.17181 | 71.82819 |
| 8 | 24.42212 | 65.57788 |
| 10 | 30.86588 | 59.13412 |
| 12 | 37.59709 | 52.40291 |
| 14 | 44.76554 | 45.23446 |
| 16 | 52.64382 | 37.35618 |
| 18 | 61.84543 | 28.15457 |
| 20 | 74.61857 | 15.38143 |
| 20.5 | 79.76542 | 10.23458 |
| 20.6 | 81.12757 | 8.872432 |
| 20.7 | 82.73315 | 7.266848 |
| 20.8 | 84.80311 | 5.19888 |
| 20.9 | 88.85036 | 1.149637 |
| 20.905 | 89.79914 | 0.200856 |

The values in this Table are calculated by assuming that air has a refractive index of 1.0 and the glass substrate and the liquid crystal layer have a refractive index of 1.5. As shown in Table 1, when the angle θ of the reflection surface exceeds 20 degrees, the outgoing angle φ becomes very large (i.e., 90-φ becomes very small), so that most of the outgoing light does not reach the user. Therefore, even if ruggednesses are provided on the reflection surface of the reflective layer, in order to effectively utilize reflected light, it must ensured in more portions of the reflection surface that the angle θ is 20 degrees or less.

Since the reflection surface 112 of the active matrix substrate 100 mentioned above has many portions which are greater than 20 degrees, reflected light is not very effectively used for displaying. In order to solve this problem, it might be possible to form an insulating layer under the reflective layer 110 and form the reflective layer 110 under this insulating layer. However, in this case, a step of forming an insulating layer and a step of forming contact holes for connecting the reflective layer 110 to the drains of the TFTs in the insulating layer are needed, thus resulting in a problem of an increase in the material and the number of steps.

Moreover, in the transflective-type liquid crystal display device of Patent Document 2, after stacking the interlayer insulating film 204 on the drain electrode 222, a step of forming ruggednesses in an upper portion thereof is needed, and a step of stacking the galvanic corrosion preventing film 205, the reflection electrode film 206, and the amorphous transparent electrode film 218 further thereupon is needed. Thus, the conventional transflective-type liquid crystal display device also has a problem in that the material and the number of steps are increased for forming the reflection region.

Furthermore, in a conventional transflective-type liquid crystal display device, ruggednesses are formed on the surface of the amorphous transparent electrode film 218, which is in contact with the liquid crystal layer 211, and therefore the electric field which is formed across the liquid crystal layer 211 is not uniform, thus making it difficult to uniformly control the orientation of the liquid crystal in a desired direction in the reflection region. Moreover, although a slope which conforms to the end shape of the interlayer insulating film 204 is formed at an end of the amorphous transparent electrode film 218, there is also a problem in that this slope disturbs the orientation of the liquid crystal near the end of the reflection region.

Moreover, there is also a problem in that, when forming a storage capacitor (Cs) in each pixel of a transflective-type liquid crystal display device, the area of the transmission region is decreased due to the presence of a storage capacitor portion or a storage capacitor line (Cs line), thus resulting in a lower aperture ratio of the liquid crystal display device.

The present invention has been made in view of the above problems, and an objective thereof is to provide at low cost a reflection-type liquid crystal display device or transflective-type liquid crystal display device having a high image quality and an excellent efficiency of utility of reflected light.

Means for Solving the Problems

A liquid crystal display device according to the present invention is a liquid crystal display device having a plurality of pixels, and comprising, in each of the plurality of pixels, a reflection section for reflecting incident light toward a display surface, wherein, the reflection section includes a metal layer having a plurality of apertures, and a reflective layer formed on the metal layer with an insulating layer interposed therebetween; a surface of the reflective layer includes a plurality of recesses or protrusions formed in accordance with a cross-sectional shape of the metal layer; and regarding distance between two adjoining apertures among the plurality of apertures of the metal layer, a shortest distance is no less than 0.3 µm and no more than 3.0 µm.

In one embodiment, of a narrow-width portion where the distance between two adjoining apertures among the plurality of apertures is no less than 0.3 µm and no more than 3.0 µm, a portion having a width of d (where d is any arbitrary value from 0.3 to 3.0) µm or less has a length which is d µm or less.

In one embodiment, the metal layer includes a plurality of main portions and a linking portion connecting the plurality of main portions; the linking portion has a width which is narrower than a width of each of a first main portion and a second main portion which are connected by the linking portion; and the linking portion has a width of no less than 0.3 µm and no more than 3.0 µm.

In one embodiment, of the linking portion, a length of a portion having a width of d (where d is any arbitrary value from 0.3 to 3.0) µm or less is d µm or less, the length being taken along a direction which is perpendicular to the width direction.

In one embodiment, the width of the first main portion and the second main portion is equal to or greater than 1.4 times the width of the linking portion.

In one embodiment, as viewed from a substrate normal direction, each of the first main portion and the second main portion has a substantially square shape; the linking portion links corner portions of the first main portion and the second main portion; and sides of the first main portion and the second main portion which are in contact with the linking portion have a length of no less than 1.0 µm and no more than 10.0 µm.

In one embodiment, a pair of electrodes for forming a storage capacitor are formed in each of the plurality of pixels; and the metal layer constitutes one of the pair of electrodes.

In one embodiment, a transistor is formed in each of the plurality of pixels; the reflective layer is electrically connected to a source electrode or a drain electrode of the transistor; and the pair of electrodes are constituted by the metal layer and the reflective layer.

In one embodiment, the surface of the reflective layer includes a plurality of recesses formed in accordance with a cross-sectional shape of the metal layer, and, regarding distance between two adjoining recesses among the plurality of recesses, a shortest distance is no less than 0.3 µm and no more than 3.0 µm.

In one embodiment, a semiconductor layer having a recess or aperture is formed between the insulating layer and the reflective layer in the reflection section; and the surface of the reflective layer has a recess or protrusion formed in accordance with a cross-sectional shape of the semiconductor layer.

In one embodiment, a side face of the recess or protrusion formed on the surface of the reflective layer has a level difference which is formed in accordance with a cross-sectional shape of the metal layer and the semiconductor layer.

In one embodiment, a transistor is formed in each of the plurality of pixels; and the metal layer is made of a same material as a gate electrode of the transistor, and the reflective layer is made of a same material as a source electrode or a drain electrode of the transistor.

One embodiment comprises a liquid crystal layer and an interlayer insulating layer and a pixel electrode interposed between the liquid crystal layer and the reflective layer, wherein a surface of the pixel electrode facing the liquid crystal layer is formed flat without conforming to a shape of the recess or protrusion of the reflective layer.

A production method for a liquid crystal display device according to the present invention is a production method for a liquid crystal display device having a plurality of pixels and including, in each of the plurality of pixels, a reflection section for reflecting incident light toward a display surface, the production method comprising the steps of: forming a metal film on a substrate; forming a resist layer on the metal film; removing a portion of the resist layer; performing an etching via the resist layer, thereby patterning the metal film to form a metal layer; and forming a reflective layer on the metal layer, wherein, in the step of forming the metal layer, the metal layer is formed so that a plurality of apertures are formed in the metal layer in the reflection section, and regarding distance between two adjoining apertures among the plurality of apertures, a shortest distance is no less than 0.3 μm and no more than 3.0 μm.

In one embodiment, in the step of forming the metal layer, the metal layer is formed so that the metal layer in the reflection section includes a plurality of main portions and a linking portion connecting the plurality of main portions, and that a minimum value of width of the linking portion is no less than 0.3 μm and no more than 3.0 μm. The linking portion is formed so as to electrically connect the main portions. Moreover, the linking portion is formed so as to connect corner portions of the main portions.

In one embodiment, in the step of removing a portion of the resist layer, a plurality of apertures are formed in the resist layer as the resist layer is removed; and regarding distance between two adjoining apertures among the plurality of apertures in the resist layer, a shortest distance is no less than 0.3 μm and no more than 3.0 μm.

In one embodiment, in the step of forming the reflective layer, a plurality of recesses or protrusions are formed on a surface of the reflective layer in accordance with a cross-sectional shape of the metal layer.

One embodiment comprises a step of forming a semiconductor layer between the insulating layer and the reflective layer in the reflection section, the semiconductor layer having a recess or aperture, wherein, in the step of forming the reflective layer, a recess or protrusion is formed on a surface of the reflective layer in accordance with a cross-sectional shape of the semiconductor layer.

In one embodiment, a transistor is formed in each of the plurality of pixels; a gate electrode of the transistor is formed in the step of forming the metal layer; and in the step of forming the reflective layer, a source electrode and a drain electrode of the transistor are formed.

Effects of the Invention

According to the present invention, a plurality of apertures in a metal layer within a reflection section have a very small interval, so that the apertures can be formed with a high density, and all metal material portion of the metal layer can be electrically connected. Therefore, the metal layer can be allowed to function as a storage capacitor electrode, and also a large number of level differences and corner portions can be formed on the surface of the reflective layer in accordance with a cross-sectional shape of the metal layer. Therefore, a liquid crystal display device having a high reflection efficiency and displaying quality can be provided.

Moreover, since level differences and corner portions on the surface of the reflective layer can be formed in accordance with a cross-sectional shape of the semiconductor layer, the reflection efficiency of the liquid crystal display device can be more enhanced.

Furthermore, since the metal layer, the insulating layer, the semiconductor layer, and the reflective layer in the reflection section are formed concurrently and from the same materials as the layers composing transistors, a reflection region having excellent reflection characteristics can be obtained at low cost, without increasing the production steps.

Moreover, according to the present invention, the face of a pixel electrode facing the liquid crystal layer is formed flat, similarly to its face on the counter electrode side, and no level difference is formed in the pixel electrode near the end of the reflection section, thus making it possible to uniformly control the orientation of liquid crystal in a desired direction. Therefore, it is possible to provide a liquid crystal display device which has a high transmittance, excellent viewing angle characteristics, and little display unevenness.

Therefore, according to the present invention, a high-quality reflection-type liquid crystal display device or transflective-type liquid crystal display device having an excellent efficiency of utility of reflected light can be provided with a production efficiency and at low cost.

DESCRIPTION OF REFERENCE NUMERALS

Figure 1:
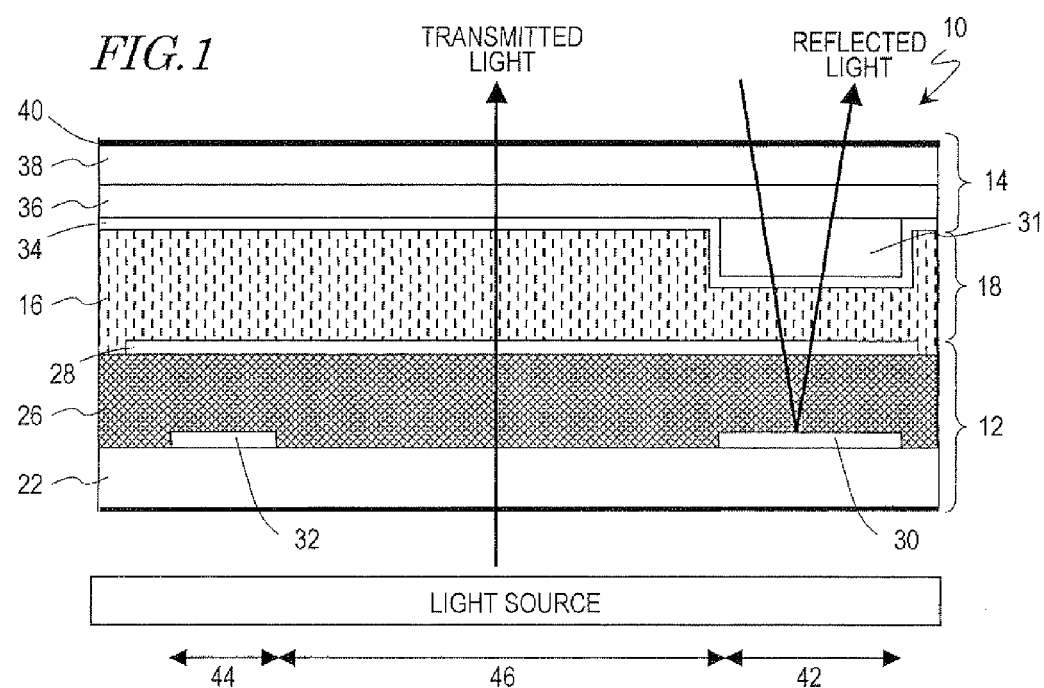
FIG. 1 A diagram schematically showing a cross-sectional shape of a liquid crystal display device according to the present invention.

| | |
|---|---|
| 10 | liquid crystal display device |
| 12 | TFT substrate |
| 14 | counter substrate |
| 16 | liquid crystal |
| 18 | liquid crystal layer |
| 22 | transparent substrate |
| 26 | interlayer insulating layer |
| 28 | pixel electrode |
| 30 | reflection section |
| 31 | adjustment layer |
| 32 | TFT section |
| 34 | counter electrode |
| 36 | CF layer |
| 38 | transparent substrate |
| 40 | display surface |
| 42 | reflection region |
| 44 | TFT region |
| 46 | transmission region |
| 48 | recess |
| 50 | pixel |
| 52 | source line |
| 54 | gate line |
| 56 | Cs line |
| 58 | contact hole |
| 59 | protrusion |
| 60 | main portion |
| 61 | insulating layer |
| 62 | semiconductor layer |
| 63 | reflective layer |
| 65, 66 | aperture |
| 68, 69 | recess |
| 70 | linking portion |
| 75 | main portion |
| 76 | linking portion |
| 80' | mask |
| 81' | light shielding portion |
| 82' | transmitting portion |
| 100 | active matrix substrate |
| 101 | insulative substrate |
| 102 | gate layer |
| 104 | gate insulating layer |
| 106 | semiconductor layer |
| 108 | metal layer |
| 110 | reflective layer |

DESCRIPTION OF REFERENCE NUMERALS -continued

| | |
|---|---|
| 112 | reflection surface |
| 203 | switching element |
| 204 | interlayer insulating film |
| 205 | galvanic corrosion preventing film |
| 206 | reflection electrode film |
| 211 | liquid crystal layer |
| 218 | amorphous transparent electrode film |
| 222 | drain electrode |

BEST MODE FOR CARRYING OUT THE INVENTION (Embodiment 1)

Hereinafter, with reference to the drawings, a first embodiment of the liquid crystal display device according to the present invention will be described.

FIG. 1 is a diagram schematically showing a cross-sectional shape of a liquid crystal display device 10 of the present embodiment. The liquid crystal display device 10 is a transflective-type (reflection/transmission-type) liquid crystal display device (LCD) by an active matrix method. As shown in FIG. 1, the liquid crystal display device 10 includes a TFT (Thin Film Transistor) substrate 12, a counter substrate 14 such as a color filter substrate (CF substrate), and a liquid crystal layer 18 containing liquid crystal 16 which is sealed between the TFT substrate 12 and the counter substrate 14.

The TFT substrate 12 includes a transparent substrate 22, an interlayer insulating layer 26, and a pixel electrode 28, and includes reflection sections 30 and TFT sections 32. Note that gate lines (scanning lines), source lines (signal lines), Cs lines (storage capacitor lines), and the like are also formed on the TFT substrate 12, which will be described later.

The counter substrate 14 includes a counter electrode 34, a color filter layer (CF layer) 36, and a transparent substrate 38. The upper face of the transparent substrate 38 serves as a display surface 40 of the liquid crystal display device. Note that although the TFT substrate 12 and the counter substrate 14 each have an alignment film and a polarizer, they are omitted from the figure.

In the liquid crystal display device 10, a region where a reflection section 30 is formed is referred to as a reflection region 42, whereas a region where a TFT section 32 is formed is referred to as a TFT region 44. In the reflection region, light entering from the display surface 40 is reflected by the reflection section 30, and travels through the liquid crystal layer 18 and the counter substrate 14 so as to go out from the display surface 40. Furthermore, the liquid crystal display device 10 has transmission regions which are formed in regions other than the reflection regions 42 and the TFT regions 44. In the transmission regions 46, light which is emitted from a light source in the liquid crystal display device 10 travels through the TFT substrate 12, the liquid crystal layer 18, and the counter substrate 14 so as to go out from the display surface 40.

Note that, by providing an adjustment layer 31 made of transmissive resin or the like on the counter substrate 14 side above each reflection section 30 as shown in FIG. 1, it is possible to reduce the thickness of the liquid crystal layer 18 in the reflection region 42 to a half of the thickness of the liquid crystal layer 18 in the transmission region 46. As a result, the optical path length can be made equal between the reflection region 42 and the transmission region 46. Although FIG. 1 illustrates the adjustment layer 31 as being formed between the counter electrode 34 and the CF layer 36, the adjustment layer 31 may be formed on the face of the counter electrode 34 facing the liquid crystal layer 18.

Figure 2:
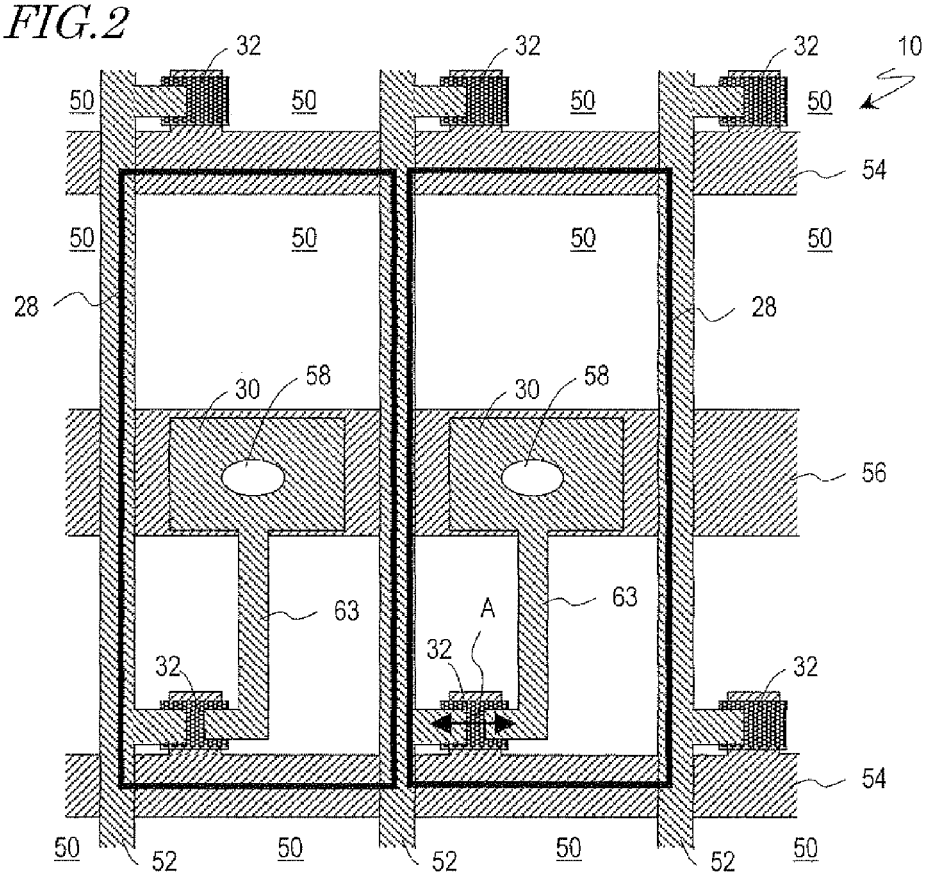
FIG. 2 A plan view showing the construction of a pixel region of a liquid crystal display device according to the present invention.

FIG. 2 is a plan view of a portion of the liquid crystal display device 10, as seen from above the display surface 40. As shown in the figure, a plurality of pixels 50 are disposed in a matrix shape in the liquid crystal display device 10. The aforementioned reflection section 30 and TFT section 32 are formed in each pixel 50, with a TFT being formed in the TFT section 32.

In the border of the pixel 50, source lines 52 extend along the column direction (up-down direction in the figure), and gate lines (also referred to as gate metal layers) 54 extend along the row direction (right-left direction in the figure). In the central portion of the pixel 50, a Cs line 56 extends along the row direction. In the interlayer insulating layer 26 of the reflection section 30, a contact hole 58 for connecting the pixel electrode 28 and the drain electrode of the TFT is formed.

Figure 5:
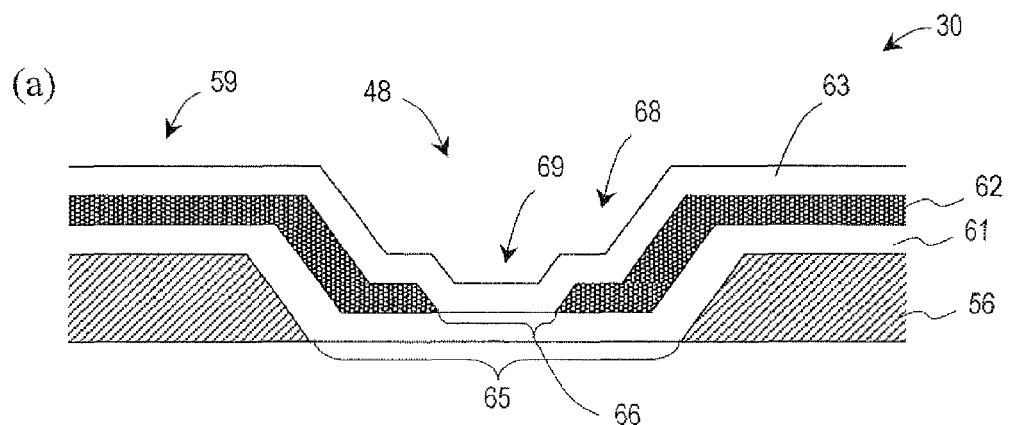
FIG. 5 Cross-sectional views showing the structure of a reflection section 30 and a TFT section 32 of Embodiment 1, where (a) shows a cross section of the reflection section 30, and (b) shows a cross section of the TFT section 32.
Figure 5:
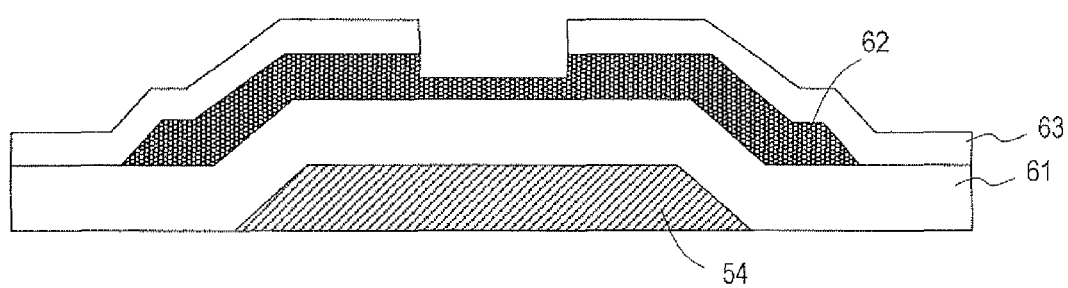

As will be described later with reference to FIG. 5, the reflection section 30 includes an insulating layer (also referred to as a gate insulating layer) 61 formed on the Cs line (which in the reflection section 30 is also referred to as a Cs metal layer or a metal layer) 56, a semiconductor layer 62 formed on the insulating layer 61, and a reflective layer 63 formed on the semiconductor layer 62, and a plurality of recesses (tapered portions) 48 are formed on the surface of the reflective layer 63. The reflective layer 63 is electrically connected to the drain electrode (or source electrode) of the TFT which is formed in the TFT section 30. The Cs metal layer 56 and the reflective layer thereabove in the reflection section 30 constitute a storage capacitor electrode and a counter electrode, such that a storage capacitor (Cs) is formed between both electrodes.

Figure 3:
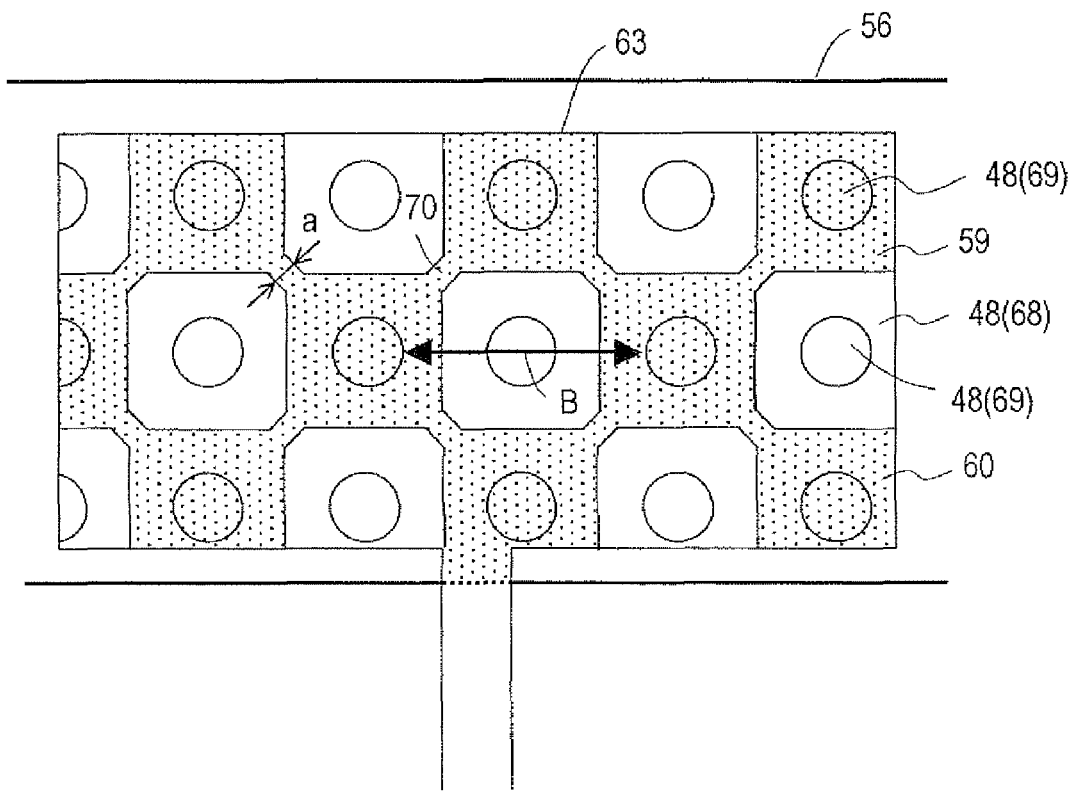
FIG. 3 A plan view showing the construction of a reflection section 30 of Embodiment 1.

FIG. 3 is a plan view schematically showing the construction of the reflection section 30 above the Cs line 56. In this figure, the contact hole 58 is omitted from illustration.

As shown in the figure, a plurality of recesses 48 are formed on the surface of the reflective layer 63 in the reflection section 30. The recesses 48 include a plurality of recesses 68 formed so as to have substantially square planar shapes and a plurality of recesses 69 formed so as to have substantially circular planar shapes. The recesses 68 are formed so as to conform to the shapes of apertures in the Cs metal layer 56, whereas the recesses 69 are formed so as to conform to the shapes of apertures or recesses in the semiconductor layer 62.

The portion where the recesses 68 are not formed (portions indicated with dots in FIG. 3) defines a protrusion 59 of the reflective layer 63. The protrusion 59 includes a plurality of main portions 60 which are formed so as to have substantially square planar shapes, and linking portions 70 which interconnect the main portions 60. Recesses 69 are also formed in the main portions 60.

The minimum value of the width a of each linking portion 70 is no less than 0.3 μm and no more than 3.0 μm. In other words, regarding the distance between two adjoining recesses 68 among the plurality of recesses 68, the shortest distance therebetween is no less than 0.3 μm and no more than 3.0 μm. Moreover, the width of each recess 68 and each main portion 60 (length of one side) is greater than the width a of each linking portion 70, and has a value of no less than 1.0 μm and no more than 10 μm, for example.

Although fewer recesses 68, recesses 69, main portions 60, and linking portions 70 than there actually are are illustrated in the figure for ease of understanding of the construction, greater numbers of recesses 68, recesses 69, main portions 60, and linking portions 70 are to be actually formed.

The main portions 60 of the recesses 68 and the protrusion 59 do not need to be formed square, but may be formed in various other shapes, e.g., polygons, circles, or ellipses. The recesses 69 may also be formed in other shapes, e.g., polygons or ellipses. It is not necessary that the recesses 69 are disposed at a uniform interval as shown. It is not necessary that one recess 69 is formed in each recess 68 and each main portion 60. Each recess 69 may be formed so as to surround a recess 68 or a main portion 60, or may be formed so that an end of the recess 69 overlap or intersect an end of a recess 68 or a main portion 60.

In the present specification, it is said that "a recess 68 overlaps a recess 69" to describe either that one of a recess 68 and a recess 69 contains the other, or that ends of both recesses overlap or intersect. Moreover, it is said that "a main portion 60 overlaps a recess 69" to describe either that one of a main portion 60 and a recess 69 contains the other, or that both overlap or intersect. As the recesses 68 and the main portions 60 overlap the recesses 69 in this manner, level differences are formed on the side faces of recesses or protrusions which are formed on the surface of the reflective layer 63.

Next, with reference to FIG. 4, the construction of the Cs metal layer 56, which serves as an underlying layer on which the recesses 68 and the protrusion 59 are to be formed, will be described.

Figure 4:
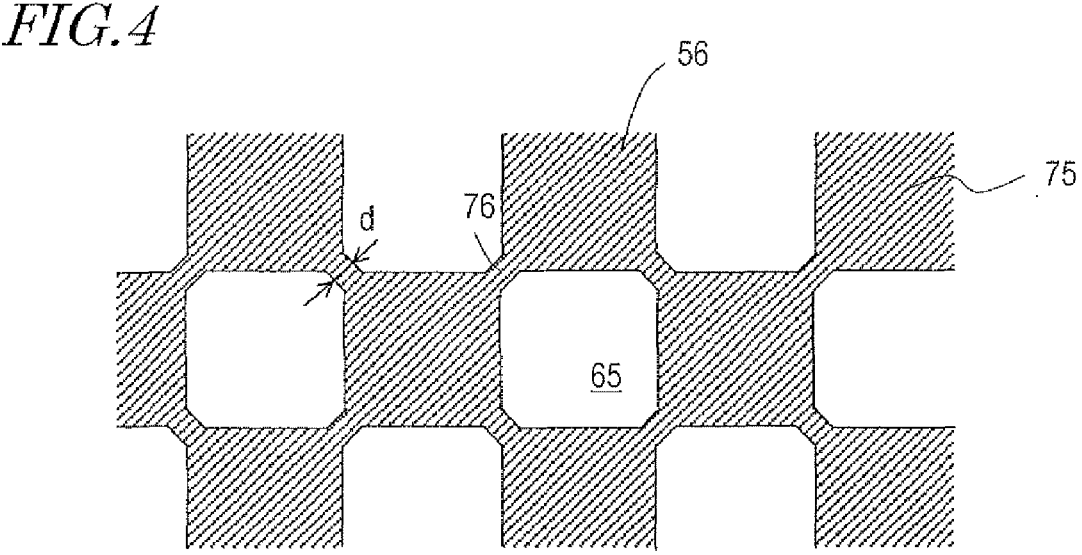
FIG. 4 A plan view showing the construction of a Cs metal layer 56 in a reflection section 30 of Embodiment 1.

FIG. 4 is a plan view showing the construction of the Cs metal layer 56. As shown in the figure, the Cs metal layer 56 includes a plurality of main portions 75 formed so as to have substantially square planar shapes, linking portions 76 each interconnecting two adjoining main portions 75, and apertures 65 surrounded by the main portions 75 and the linking portions 76. In this figure, a portion of the Cs metal layer 56 is shown enlarged for ease of understanding of the construction, and therefore fewer main portions 75, linking portions 76, and apertures 65 than there actually are are illustrated. In actuality, the Cs metal layer 56 includes more main portions 75, linking portions 76, and apertures 65.

The minimum value of the width d of each linking portion 76 is no less than 0.3 μm and no more than 3.0 μm. In other words, regarding the distance between two adjoining apertures 65 among the plurality of apertures 65, the shortest distance therebetween is no less than 0.3 μm and no more than 3.0 μm. Moreover, the width of each main portion 75 and each aperture 65 (length of one side) is greater than the width d of each linking portion 76, and has a value of no less than 1.0 μm and no more than 10 μm, for example.

The main portions 75 and recesses 65 do not need to be formed square, but may be formed in various other shapes, e.g., polygons, circles, or ellipses. It is not necessary that the main portions 75 and recesses 65 are disposed at a uniform interval as shown.

Next, with reference to FIG. 5, the construction of the reflection section 30 and the TFT section 32 will be described more specifically.

FIG. 5(a) shows a cross section of the reflection section 30 (a cross section of a portion shown by arrow B in FIG. 3). As shown in the figure, in the reflection section 30, the Cs metal layer 56, the insulating layer 61, the semiconductor layer 62, and the reflective layer 63 are stacked. The semiconductor layer 62 is composed of an intrinsic amorphous silicon layer (Si(i) layer) and an $n^+$ amorphous silicon layer (Si($n^+$) layer) which is doped with phosphorus, for example.

The Cs metal layer 56 has an aperture 65, and the semiconductor layer 62 has an aperture 66, such that the aperture 66 is located inside the aperture 65. A recess 68 is formed on the surface of the reflective layer 63 above the aperture 65, so as to conform to the cross-sectional shape of the aperture 65. A recess 69 is formed on the surface of the reflective layer 63 above the aperture 66, so as to conform to the cross-sectional shape of the aperture 66. As the recess 68 and the recess 69 overlap, a level difference is formed on the inner slope of the recess 48. Although omitted from illustration herein, recesses 69 conforming to the cross-sectional shapes of the recesses 66 of the semiconductor layer 62 are also formed in the protrusion 59 of the reflective layer 63.

Recesses (dents) may be formed instead of the apertures 66 in the semiconductor layer, and the recesses 69 of the reflective layer 63 may be formed so as to conform to such recesses (dents) of the semiconductor layer. Moreover, a level difference may be given to the side face of each aperture 65 of the Cs metal layer, and a level difference may be conformingly given to the side face of the recess 68 of the reflective layer. Similarly, a level difference may be given to the side face of each aperture 66 of the semiconductor layer 62, and a level difference may be given to the side face of the recess 69 of the reflective layer. Moreover, more recesses may be formed in the reflective layer by providing more apertures or recesses in the insulating layer 61.

Moreover, instead of forming apertures or recesses in the insulating layer or the semiconductor layer, these layers may be distributed in island shapes. In this case, a plurality of protrusions are formed in the reflective layer 63 so as to conform to these layers which are disposed in island shapes, and in the neighborhood of these protrusions, a plurality of recesses which overlap one another and which have level differences on their side faces are formed.

FIG. 5(b) is a cross-sectional view of a portion at arrow A in FIG. 2, showing the construction of the gate metal layer (metal layer) 54, the insulating layer (gate insulating layer) 61, the semiconductor layer 62, and the reflective layer 63 in the TFT section 32. The gate metal layer 54 in the TFT section 32 is formed concurrently with and from the same member as the Cs line 56 and the Cs metal layer 56 in the reflection section 30. Similarly, the insulating layer 61, the semiconductor layer 62, and the reflective layer 63 in the TFT section 32 are formed concurrently with and from the same member as, respectively, the insulating layer 61, the semiconductor layer 62, and the reflective layer 63 in the reflection section 30.

Figure 6:
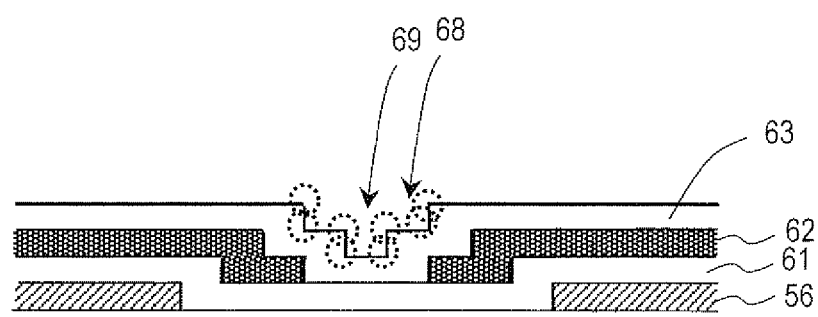
FIG. 6 A schematic diagram for comparison between the liquid crystal display device according to the present invention and a conventional liquid crystal display device with respect to their reflection section constructions, where (a) is a diagram showing a cross section of a reflection section according to the present invention; (b) is a diagram showing a cross section of the conventional reflection section; and (c) is a diagram describing surface angles at a corner portion of the reflection section.
Figure 6:
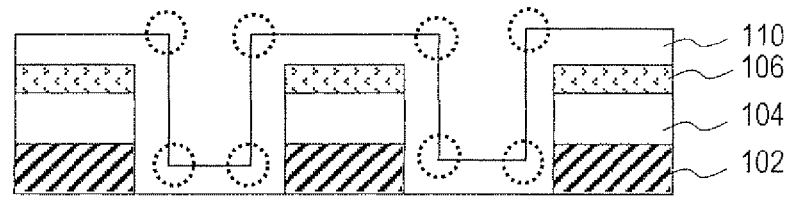
Figure 6:
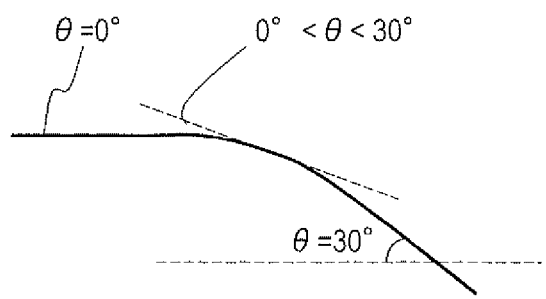
Figure 11:
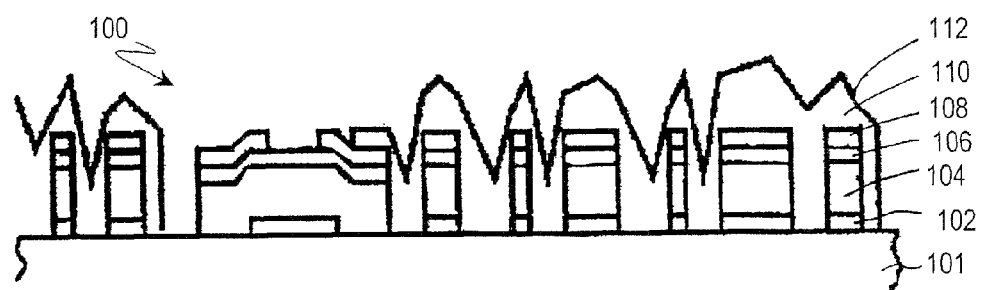
FIG. 11 A cross-sectional view showing an active matrix substrate of a conventional reflection-type liquid crystal display device.

FIG. 6 is cross-sectional views for structural comparison between the reflection section 30 of Embodiment 1 and the reflection section of the conventional liquid crystal display device shown in FIG. 11. FIG. 6(a) schematically shows the structure of the reflection section 30 of Embodiment 1, and FIG. 6(b) schematically shows the structure of the reflection section of the conventional liquid crystal display device. Note that, in these figures, for simplicity, the slopes of each layer of the reflection section 30 and the slopes of each layer of the conventional liquid crystal display device are illustrated as vertical planes, and the corner portions of each level difference (portions shown by dotted circles in the figure) are illustrated as making perpendicular turns.

As shown in these figures, on the surface of the reflective layer 63 in the reflection section 30 of Embodiment 1, a total of eight corner portions are formed by one recess 48 and one recess 69. On the other hand, in the conventional liquid crystal display device, only four corner portions are formed in one recess of the reflection section.

Although these corner portions are illustrated as being perpendicular in FIGS. 6(a) and (b), in an actual corner portion, as shown in FIG. 6(c), a face having angles which are larger than 20 degrees (exemplified as 30 degrees in this figure) with respect to the substrate is continuously formed from a plane (with an angle of 0 degrees) which is parallel to the substrate. Therefore, by forming more recesses in the reflection section, it becomes possible to form more faces (effective reflection surfaces) whose angle with respect to the substrate is 20 degrees or less on the surface of the reflective layer.

Moreover, since the effective reflection surfaces that are formed in a corner portion have various tilting angles which are different from one another, the reflected light will not travel in one fixed direction. Therefore, by forming more recesses, it becomes possible to obtain more reflected light which spans a broad range. Moreover, by increasing the number of recesses and ensuring that the tilting angle of the side face of any recess is 20 degrees or less, more reflected light which spans an even broader range can be obtained.

As shown in FIGS. 6(a) and (b), more corner portions than in the conventional liquid crystal display device are formed in the reflection section 30 of Embodiment 1. As a result, it becomes possible to form more effective reflection surfaces on the surface of the reflective layer 63, whereby more light can be reflected toward the display surface across a broad range. Moreover, the recess 69 and the recess 68 are formed in accordance with the shapes to which the Cs metal layer and the semiconductor layer are shaped. Therefore, the shapes, depths, the slope tilting angles, and the like of the recesses 69 and recesses 68 can be easily adjusted during the shaping of the Cs metal layer or the semiconductor layer.

Moreover, the reflective layer 63 which is located inside the recess 69 or the recess 68 in Embodiment 1 is formed above the insulating layer 61, or above the insulating layer 61 and the semiconductor layer 62. On the other hand, in the conventional liquid crystal display device, the reflective layer inside the recess is directly formed on the glass substrate, via neither the gate insulating layer nor the semiconductor layer. Therefore, the bottom face of the recess of Embodiment 1 is formed at a position which is shallower than the bottom face of a recess of the conventional liquid crystal display device. As a result, incident light can be reflected more effectively across a broad range.

In the conventional liquid crystal display device, the bottom face of a recess is formed at a deep position, so that the tilting angle of the recess inner surface is large, which makes it difficult to form a large number of effective reflection surfaces having a tilting angle of 20 degrees or less within the recess. Moreover, since this recess is formed by forming the gate layer 102, the gate insulating layer 104, and the semiconductor layer 106, and thereafter altogether removing these layers, it has been difficult to increase the effective reflection surface by controlling the tilting angle of the recess inner surface.

In the display device of the present embodiment, a recess (and a protrusion) of the reflective layer are formed in accordance with the shapes of the Cs metal layer and the semiconductor layer, and therefore the number of recesses and corner portions in the reflective layer can be increased, and the positions, sizes, and shapes of the recesses can be adjusted when stacking these layers. As a result, the tilt of the slopes of the recesses can be controlled, whereby a larger number of effective reflection surfaces with a tilting angle of 20 degrees or less can be formed, thus allowing more light to be reflected toward the display surface.

Moreover, in the display device of the present embodiment, all portion (metal portion) other than the apertures of the Cs metal layer in the reflection section is electrically connected by linking portions having a barely producible very thin width. Therefore, the main portions and apertures can be formed so as to be very small and with a high density, such that all of the metal portion is allowed to function as a storage capacitor electrode.

Figure 12:
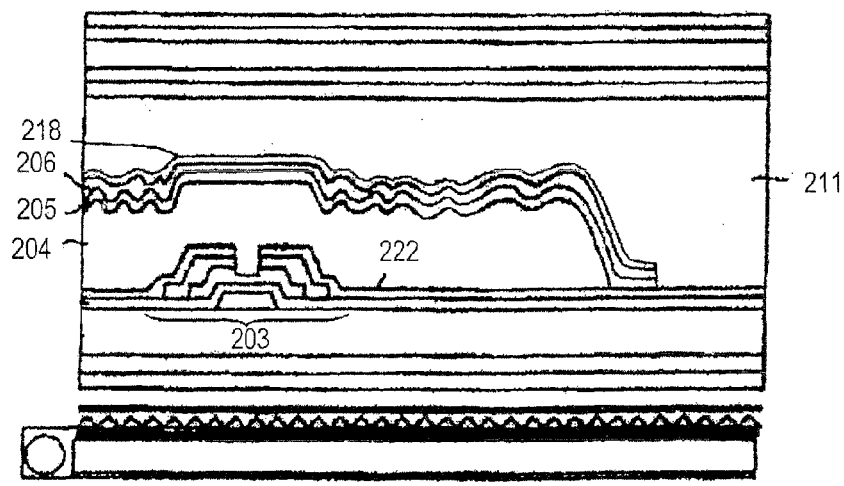
FIG. 12 A cross-sectional view of a conventional transflective-type liquid crystal display device.
Figure 13:
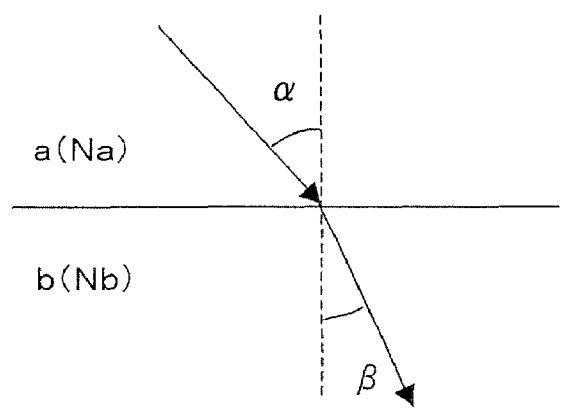
FIG. 13 A diagram showing a relationship between a tilt of a reflection surface and reflected light in a liquid crystal display device, where (a) shows a relationship between an incident angle α and an outgoing angle β when light enters a medium b having a refractive index Nb from a medium a having a refractive index Na, and (b) shows a relationship between incident light and reflected light as well as the angle of the display surface of the liquid crystal display device.
Figure 13:
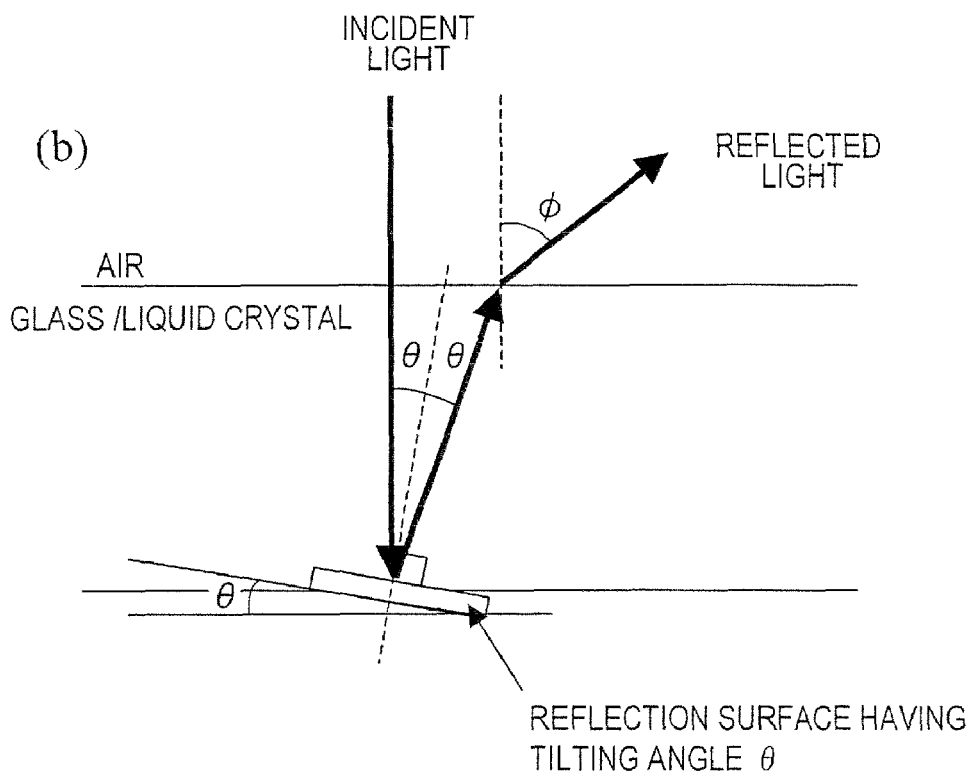

Furthermore, in the liquid crystal display device of the present embodiment, as shown in FIG. 1, the faces of the interlayer insulating layer 26 and the pixel electrode 28 that are on the liquid crystal layer 18 side are formed flat without conforming to the shapes of the recesses 68 of the reflective layer 63, similarly to the face of the counter electrode 34 that is on the liquid crystal layer 18 side. Therefore, as compared to the conventional transflective-type liquid crystal display device shown in FIG. 12, the electric field which is formed across the liquid crystal layer 18 becomes uniform, thus making it possible to uniformly control the orientation of the liquid crystal of the reflection region 42 in a desired direction.

Moreover, since no level differences are formed in the pixel electrode 28 near the ends of the reflection section 30, the liquid crystal orientation is not disturbed. As a result, a liquid crystal display device can be provided which has a high transmittance and excellent viewing angle characteristics, with little display unevenness.

Figure 7:
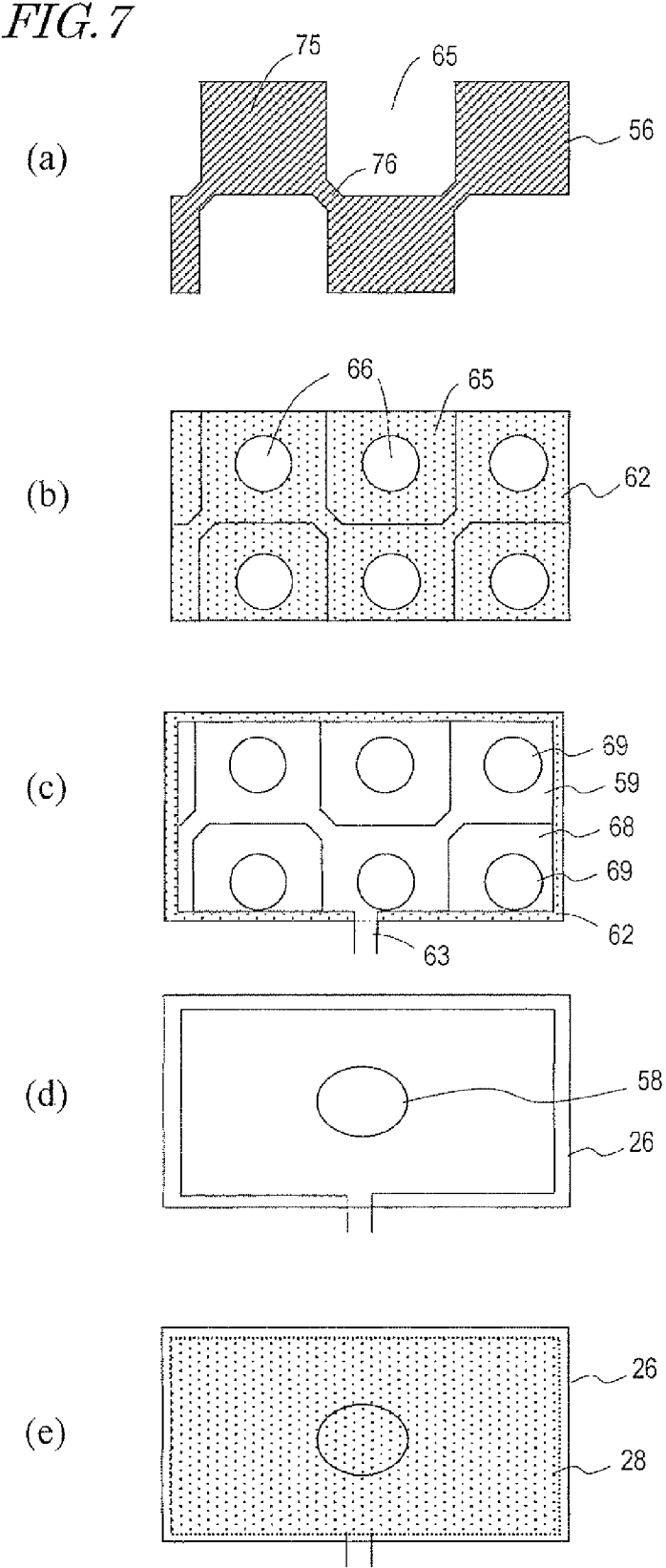
FIG. 7 Plan views showing a production method for a reflection section of Embodiment 1.
Figure 8:
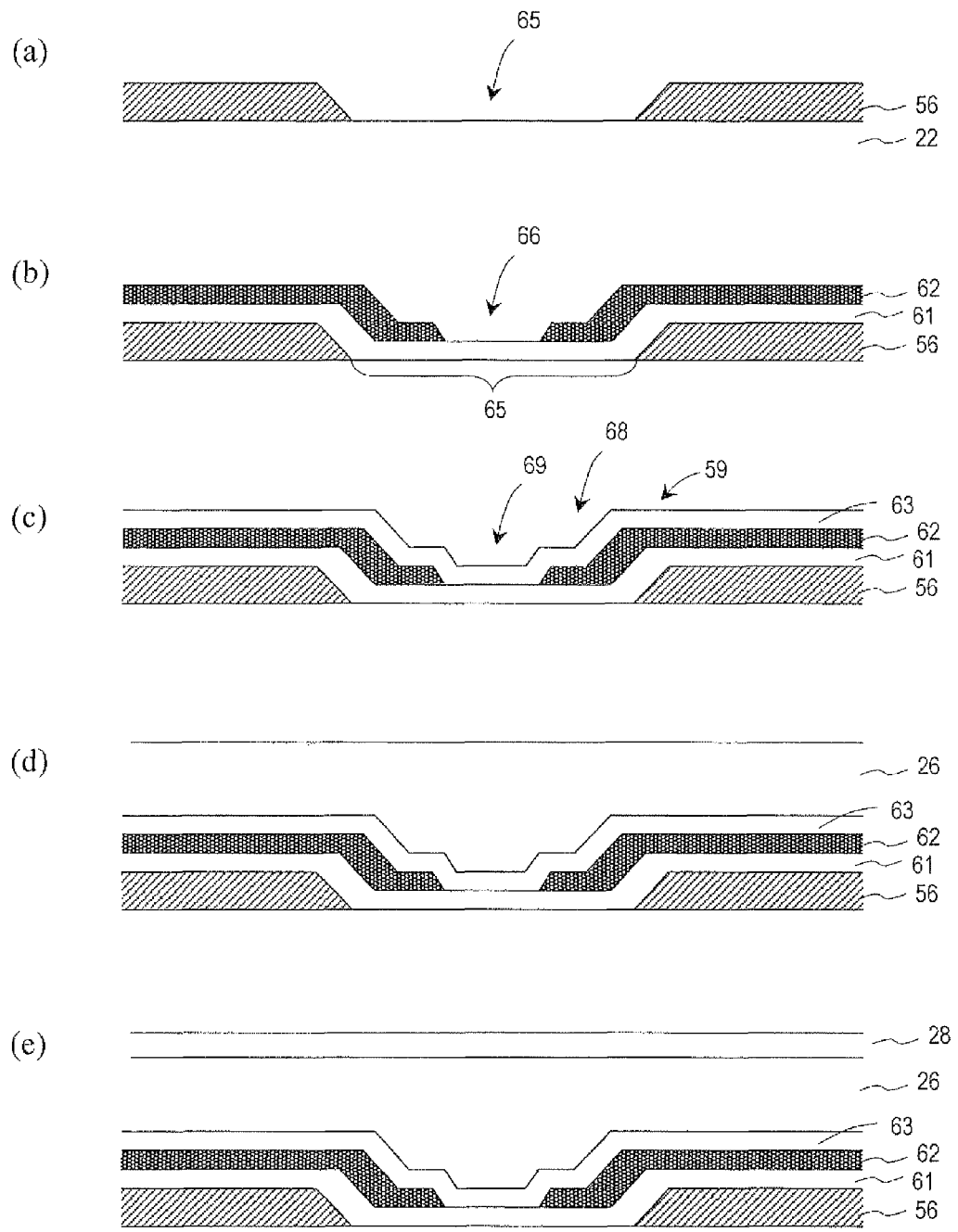
FIG. 8 Cross-sectional views showing a production method for a reflection section of Embodiment 1.

Next, a production method for the TFT substrate 12 will be described with reference to FIG. 7 and FIG. 8. FIG. 7 is plan views showing a production process, in the reflection region 42, for the TFT substrate 12. FIG. 8 is cross-sectional views showing a production process, in the reflection region 42, for the TFT substrate 12 (a portion shown at arrow B in FIG. 3). Note that, for ease of description, FIG. 7 illustrates enlarged a portion of the Cs metal layer 56, the semiconductor layer 62, and the reflective layer 63. Accordingly, FIG. 7 only shows a portion of a pattern which is formed in each such layer.

As shown in FIG. 7(a) and FIG. 8(a), first, by a method such as sputtering, a thin metal film of Al (aluminum) is formed on the transparent substrate 22 having been cleaned. Other than Al, this thin metal film may be formed by using Al (aluminum), Ti (titanium), Cr (chromium), Mo (molybdenum), Ta (tantalum), W (tungsten), or an alloy thereof, etc., or formed from a multilayer body of a layer of such materials and a nitride film.

Thereafter, a resist film is formed on the thin metal film, and after forming a resist pattern by removing a portion of the resist through an exposure-development step (this step will be further described later with reference to FIG. 9), a dry or wet etching is performed through the resist pattern to form the Cs metal layer 56 having the apertures 65. The thickness of the Cs metal layer 56 is 50 to 1000 nm, for example.

Herein, the Cs metal layer 56 is formed so that the minimum value of the width of the connecting portions 76 thereof is no less than 0.3 µm and no more than 3.0 µm, that is, regarding the distance between two adjoining apertures 65, the shortest distance is no less than 0.3 µm and no more than 3.0 µm. Note that, in this step, the gate lines 54 and the Cs lines 56 shown in FIG. 2 and the gate metal layer 54 in the TFT section 32 shown in FIG. 5(b) are also formed concurrently from the same metal.

Next, as shown in FIG. 7(b) and FIG. 8(b), by using P-CVD technique and a gaseous mixture of $SiH_4$, $NH_3$, and $N_2$, the insulating layer 61 composed of SiN (silicon nitride) is formed across the entire substrate surface. The insulating layer 61 may also be composed of $SiO_2$ (silicon oxide), $Ta_2O_5$ (tantalum oxide), $Al_2O_3$ (aluminum oxide), or the like. The thickness of the insulating layer 61 is 100 to 600 nm, for example. In this step, the insulating layer 61 of the TFT section 32 shown in FIG. 5(b) is also formed concurrently.

Next, on the gate insulating layer 61, an amorphous silicon (a-Si) film and an $n^+$ a-Si film obtained by doping amorphous silicon with phosphorus (P) are formed. The thickness of the a-Si film is 30 to 300 nm. The thickness of the $n^+$ a-Si film is 20 to 100 nm. Thereafter, by patterning these films by photolithography technique, the semiconductor layer 62 having the apertures 66 is formed. Herein, by using a resist pattern in which the light shielding portions and the transmitting portions in the reflection section 30 are inverted, the semiconductor layer 62 may be formed only at positions corresponding to the apertures. In this step, the semiconductor layer 62 of the TFT section 32 shown in FIG. 5(b) is also formed concurrently.

Next, as shown in FIG. 7(c) and FIG. 8(c), a thin metal film of Al or the like is formed across the entire substrate surface by sputtering technique or the like, thus forming the reflective layer 63. For the thin metal film, the materials which are mentioned above as materials for the Cs metal layer 56 may be used. The thickness of the reflective layer 63 is 30 to 1000 nm or less.

At this time, the recesses 68 are formed on the surface of the reflective layer 63 above the apertures 65 in the Cs metal layer 56, and the recesses 69 are formed on the surface of the reflective layer 63 above the apertures 66 in the semiconductor layer 62. In this step, the reflective layer 63 shown in FIG. 5(b) is also formed concurrently, and in the TFT section 32, the reflective layer 63 forms a source electrode and a drain electrode of the TFT. Also at this time, the source line 52 in FIG. 2 is also formed as a portion of the reflective layer 63.

Next, as shown in FIG. 7(d) and FIG. 8(d), a photosensitive acrylic resin is applied by spin-coating, whereby the interlayer insulating layer (interlayer resin layer) 26 is formed. The thickness of the interlayer insulating layer 26 is 0.3 to 5 µm. Although a thin film such as $SiN_x$ or $SiO_2$ may be formed by P-CVD technique as a protection film between the reflective layer 63 and the interlayer insulating layer 26, such is omitted from the figure. The thickness of the protection film is 50 to 1000 nm. The interlayer insulating layer 26 and the protection film are formed not only on the reflection region 42, but also on the entire upper surface of the transparent substrate 22 including the TFT region 44. Thereafter, by photolithography technique, a contact hole 58 is formed near the center of the reflection section 30.

Next, as shown in FIG. 7(e) and FIG. 8(e), a transparent electrode film of ITO, IZO, or the like is formed on the interlayer insulating layer 26 by sputtering technique or the like, and this transparent electrode film is subjected to pattern shaping by photolithography technique, whereby the pixel electrode 28 is formed. The pixel electrode 28 is formed not only on the reflection region 42 but also on the entire upper surface of the pixel including the TFT region 44.

In the reflection region 42, the pixel electrode 28 is formed above the interlayer insulating layer 26 and the contact hole 58, such that the metal member of the pixel electrode 28 is in contact with the reflective layer 63 via the contact hole 58. As a result, the drain electrode of the TFT in the TFT section 32 is electrically connected to the pixel electrode 28 via the contact hole 58. In the above step, the upper face of the interlayer insulating layer 26 and the surface of the pixel electrode 28 are formed flat without conforming to the shapes of the recesses 48 of the reflective layer 63.

Preferably, as many recesses 68 and 69 as possible are formed on the reflective layer 63. Therefore, it is preferable that as many apertures in the Cs metal layer and the semiconductor layer as possible are formed, within the limitations of the masks and photoexposure during the production step. The preferable maximum width of each aperture in the Cs metal layer and the semiconductor layer is 1.0 to 10 µm.

In the production steps of the reflection section 30 of Embodiment 1, as described above, each layer is formed through the same step and from the same material as a layer composing the TFT, thus rendering unnecessary any special steps for forming the recesses and the like in the reflective layer 63. Therefore, it becomes possible to reduce the production cost while enhancing the production efficiency of the liquid crystal display device.

Next, with reference to FIG. 9, an exposure-development step for forming the Cs metal layer 56 in the reflection section 30 will be described.

In order to obtain the Cs metal layer 56 shown in FIG. 4, a pattern corresponding to the shape of the Cs metal layer 56 is drawn on a mask which is used in the exposure step, with light shielding portions and transmitting portions. In the exposure step, a resist which has been cured through pre-baking is irradiated with light such as UV light through the mask, whereby the pattern drawn on the mask is transferred onto the resist. Although the description herein assumes use of a positive type resist such that exposed portions of the resist are dissolved with a developer, it is also possible to employ a negative type resist.

Thereafter, a development process is performed so that a portion of the resist having been dissolved by the developer is removed, and a post-baking is performed, whereby a resist layer (resist pattern) having the mask pattern transferred thereon is formed.

Figure 9:
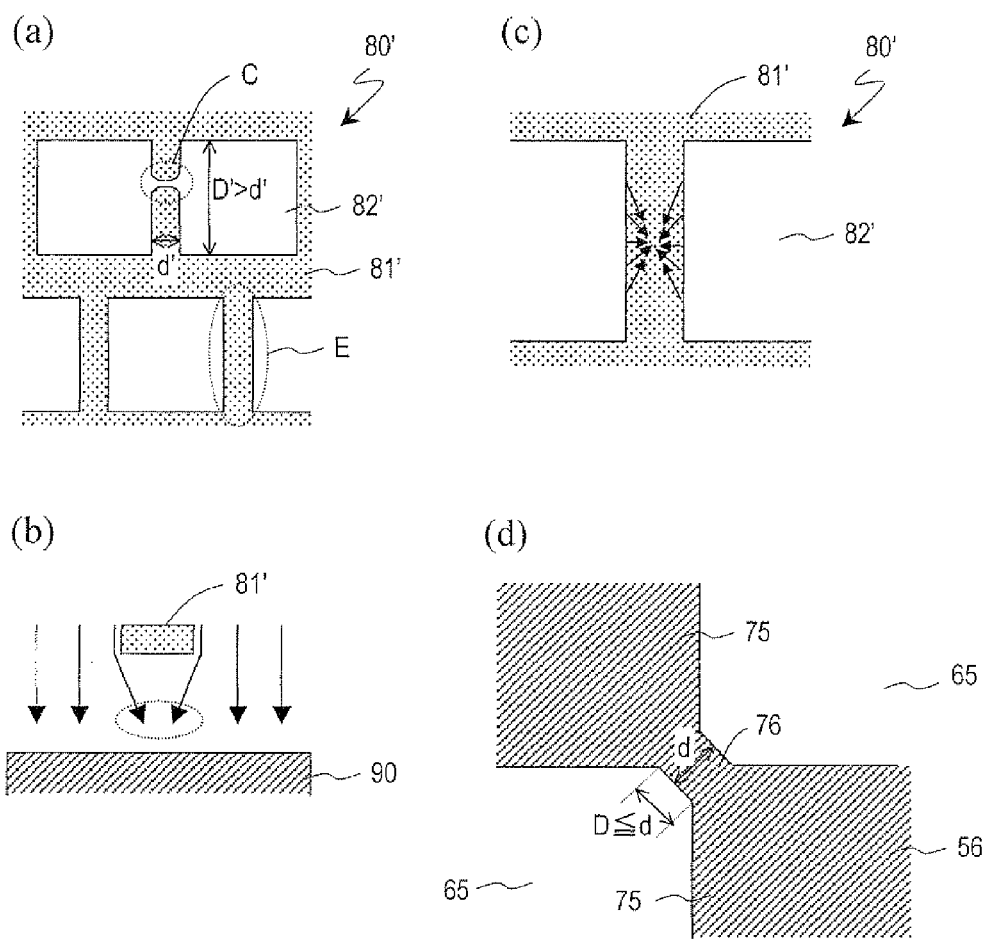
FIG. 9 A diagram for describing a transfer of linking portions of a mask pattern, where: (a) shows linking portions of a mask according to Reference Example; (b) shows diffraction of light due to a mask at the time of exposure; (c) shows diffraction of light according to Reference Example; and (d) shows construction near a linking portion 76 according to Embodiment 1.

FIG. 9 is a diagram for describing a transfer of linking portions via exposure, where: (a) shows linking portions of a mask according to Reference Example; (b) shows diffraction of light due to a mask at the time of exposure; (c) shows diffraction of light according to Reference Example; and (d) shows construction near a linking portion of the Cs metal layer 56 shown in FIG. 4.

As shown in FIG. 9(a), a mask 80' according to Reference Example includes: a light shielding portion 81'; and a plurality of transmitting portions 82' each having a uniform rectangle shape and being disposed in parallel within the light shielding portion 81'. Herein, in order to form as many protrusions (or recesses) in the reflective layer as possible, the interval d' between adjoining transmitting portions 82' is set so small as about 0.3 to about 3.0 μm, and the width (length of one side) D' of one transmitting portion 82' is set greater than the interval d'.

As shown in FIG. 9(b), generally speaking, when the resist 90 is exposed to light through a mask, light comes around under the light shielding portion 81' of the mask due to a diffraction phenomenon of light, thus causing a problem in that the width of the resist that remains after development (and the width of the metal layer which is subsequently shaped) becomes narrower than the width of the light shielding portion 81'.

FIG. 9(c) shows enlarged a region E in FIG. 9(a). When the width D' of transmitting portion 82' is greater than the interval d' between transmitting portions 82' as in the mask 80' of Reference Example, as shown in FIG. 9(c), the amount of light diffracted toward a single point on the light shielding portion 81' interposed between the transmitting portions 82' at the time of exposure becomes increased. As a result, as shown in region C of FIG. 9(a), the resist under the light shielding portion 81' is likely to be cut apart. If the resist under the light shielding portion 81' is cut apart at many positions, electrically isolated regions will formed in the Cs metal layer that is subsequently shaped, such that the Cs metal layer will not sufficiently function as a storage capacitor electrode. Therefore, with Reference Example, it is difficult to at once obtain a predetermined storage capacitor and form recesses (and protrusions) in the reflection section with a high density.

In order to eliminate this problem, in the mask which is used for the production of Embodiment 1, the main portions of adjoining light shielding portions are linked at corner portions of the main portions. By using such a mask, the Cs metal layer 56 as shown in FIG. 4 and FIG. 9(d) is obtained. Note that the construction of the Cs metal layer shown in FIG. 9(d) may also be regarded as the construction of the resist pattern which is formed in the exposure-development step.

As shown in FIG. 9(d), the linking portions 76 of the Cs metal layer 56 are formed at corner portions of the main portions 75, and have a length D which is shorter than their width d. The width of the linking portions 76 of the Cs metal layer 56 is so narrow as 0.3 to 3.0 μm in order to form as many protrusions (or recesses) in the reflective layer 63 as possible. However, since the linking portions 76 are formed at corner portions of the main portions 75, and the length D of the linking portions 76 is set shorter than their width d, the amount of light which is diffracted to under the mask in the exposure step is small, and no cutting of the linking portions 76 occurs.

Now, a linking portion 76 is a portion of the Cs metal layer 56 that connects between two main portions (a first main portion and a second main portion) 75, the portion having a width which is narrower than the width of each of the two main portions 75. The length of a linking portion 76 along a direction which is perpendicular to the width direction is shorter than the width of the linking portion 76. Moreover, in order to prevent cutting due to diffraction of light at the time of exposure, it is preferable that the width of each of the two main portions 75 is equal to or greater than 1.4 times the width of the linking portion 76.

In the present embodiment, as viewed from the substrate normal direction, each main portion 75 has a substantially square shape, and a linking portion 76 links the respective corner portions of two main portions 75, and has a width of 1 μm, a length of 0.8 μm; and the length of a side of the two main portions 75 that is in contact with the linking portion 76 is 5 μm. It is preferable that the linking portion 76 has a width of no less than 0.3 μm and no more than 3.0 μm, and a length of no less than 0.1 μm and no more than 3.0 μm. Moreover, it is preferable that the width of the main portions 75 (length of one side) is no less than 1.0 μm and no more than 10.0 μm.

Stated otherwise, the linking portion 76 is narrow-width portion of the Cs metal layer 56 that is interposed between two adjoining apertures 65, the portion having a width of no less than 0.3 μm and no more than 3.0 μm. The length (length along a direction which is perpendicular to the width direction) of the narrow-width portion, i.e., a portion of the linking portion 76 that has a width of d (where d is any arbitrary value from 0.3 to 3.0) μm or less, is d μm or less.

Thus, according to Embodiment 1, by setting the length of linking portions 76 to be shorter than their width, it is possible to reduce the amount of light which, comes under a mask region corresponding to the linking portions 76 at the time of exposure, and therefore cutting of the resist and the Cs metal layer 56 can be prevented. As a result, the Cs metal layer 56 is allowed to have a function of a storage capacitor electrode, and it is also possible to form the resist and the connecting portions of the Cs metal layer 56 to be as thin as the exposure accuracy permits, whereby protrusions (or recesses) can be formed in the reflective layer 63 with a high density.

Thus, according to the present embodiment, it is possible to provide a high-quality reflection-type or transflective-type liquid crystal display device which allows reflected light to be efficiently utilized and which has a high reliability, with a good production efficiency and at low cost.

(Embodiment 2)

Hereinafter, with reference to the drawings, a second embodiment of the liquid crystal display device according to the present invention will be described. Constituent elements which are identical to the constituent elements of Embodiment 1 are denoted by like reference numerals, and the descriptions thereof are omitted.

Figure 10:
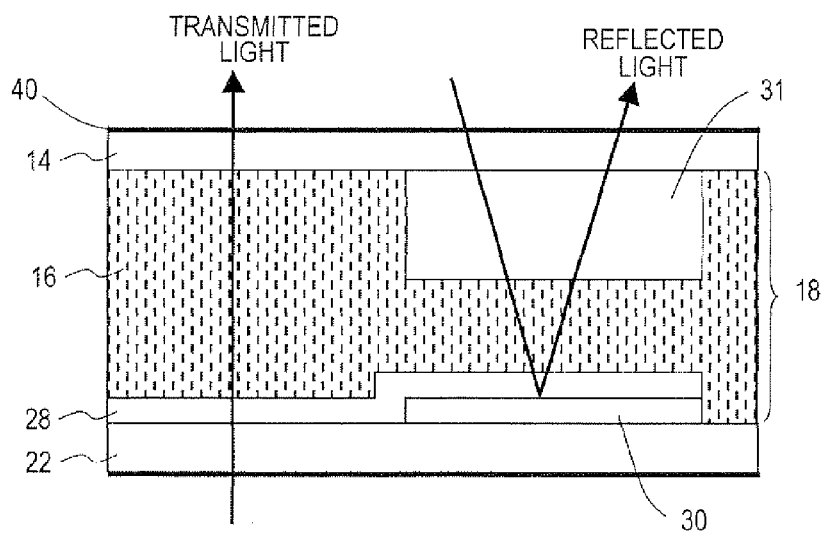
FIG. 10 A cross-sectional view showing a liquid crystal display device according to Embodiment 2.

FIG. 10 is a diagram schematically showing a cross-sectional shape of the liquid crystal display device of the present embodiment. This liquid crystal display device is based on the liquid crystal display devices of Embodiment 1 from which the interlayer insulating layer 26 is excluded, and is identical to the liquid crystal display devices of Embodiment 1 except for the points discussed below. Note that, in FIG. 10, the detailed structure of the counter substrate 14 and the TFT section 32 are omitted from illustration.

As shown in the figure, in Embodiment 2, no interlayer insulating layer 26 is formed, and therefore the pixel electrode 28 is formed upon the reflective layer 63 in the reflection section 30 and the TFT section 32, via an insulative film not shown. The structure and production method for the reflection section 30 and the TFT section 32 are the same as those which were described in Embodiment 1 except that the interlayer insulating layer 26 is eliminated. The pixel layout and wiring structure in the display device are also similar to what is shown in FIG. 2. Also with the construction of Embodiment 2, similarly to Embodiment 1, the effective reflection surface of the reflective layer is expanded in area, so that more light can be reflected toward the display surface, and the aperture ratio of the transmission regions can be increased.

As has been illustrated by the above Embodiments, a liquid crystal display device according to the present invention includes a large number of level differences and corner portions on the surface of a reflective layer, as well as a large number of slopes with a tilting angle of 20 degrees or less, and therefore acquires reflection regions with broad effective reflection surfaces and excellent scattering characteristics. Thus, a liquid crystal display device having a high brightness and being capable of clear displaying can be provided.

Moreover, since the level differences and corner portions on the reflection surface are formed in accordance with the shapes of the Cs metal layer and the semiconductor layer just when they are shaped, reflection regions having excellent reflection characteristics can be easily obtained without increasing the production steps. Furthermore, according to the present invention, the level differences and corner portions of the reflection surface can be formed based on layers which are formed concurrently and from the same material as a layer composing the TFTs, thus making it possible to provide a liquid crystal display device having a high reflection efficiency with a good production efficiency and inexpensively.

Moreover, according to the present invention, it is possible to electrically connect all main portions (metal portion) of the Cs metal layer in a reflection section, and yet form the main portions and the apertures so as to be very small and have a high density. Thus, the reflection efficiency due to the reflective layer can be enhanced without degrading the function of the storage capacitors.

Furthermore, according to the present invention, the face of a pixel electrode facing the liquid crystal layer is formed flat, similarly to its face on the counter electrode side, and no level difference is formed in the pixel electrode near the end of the reflection section, thus making it possible to uniformly control the orientation of liquid crystal in a desired direction. Therefore, it is possible to provide a liquid crystal display device which has a high transmittance, excellent viewing angle characteristics, and little display unevenness.

The liquid crystal display device according to the present invention encompasses display apparatuses, television sets, mobile phones, etc., in which a liquid crystal panel is utilized.

INDUSTRIAL APPLICABILITY

According to the present invention, a reflection-type liquid crystal display device and a transflective-type liquid crystal display device having a high image quality can be provided inexpensively. Liquid crystal display devices according to the present invention are suitably used for various transflective-type liquid crystal display devices, e.g., mobile phones, onboard display devices such as car navigation systems, display devices of ATMs and vending machines, etc., portable display devices, laptop PCs, and the like.

The invention claimed is:

1. A liquid crystal display device having a plurality of pixels, and comprising,
   in each of the plurality of pixels, a reflection section for reflecting incident light toward a display surface, wherein,
   the reflection section includes a metal layer having a plurality of apertures, and a reflective layer formed on the metal layer with an insulating layer interposed therebetween;
   a surface of the reflective layer includes a plurality of recesses or protrusions formed in accordance with a cross-sectional shape of the metal layer;
   regarding distance between two adjacent apertures among the plurality of apertures of the metal layer, a shortest distance is no less than 0.3 µm and no more than 3.0 µm; and
   wherein the metal layer includes a plurality of main portions and a linking portion connecting the plurality of main portions, the linking portion has a width which is narrower than a width of each of a first main portion and a second main portion which are connected by the linking portion, and the linking portion has a width of no less than 0.3 µm and no more than 3.0 µm.

2. The liquid crystal display device of claim 1, wherein, of a narrow-width portion where the distance between two adjacent apertures among the plurality of apertures is no less than 0.3 µm and no more than 3.0 µm, a portion having a width of d (where d is any arbitrary value from 0.3 to 3.0) µm or less has a length which is d µm or less.

3. The liquid crystal display device of claim 1, wherein, of the linking portion, a length of a portion having a width of d (where d is any arbitrary value from 0.3 to 3.0) µm or less is d µm or less, the length being taken along a direction which is perpendicular to the width direction.

4. The liquid crystal display device of claim 3, wherein the width of the first main portion and the second main portion is equal to or greater than 1.4 times the width of the linking portion.

5. The liquid crystal display device of claim 1, wherein, as viewed from a substrate normal direction, each of the first main portion and the second main portion has a substantially square shape; the linking portion links corner portions of the first main portion and the second main portion; and sides of the first main portion and the second main portion which are in contact with the linking portion have a length of no less than 1.0 µm and no more than 10.0 µm.

6. The liquid crystal display device of claim 1, wherein,
a pair of electrodes for forming a storage capacitor are formed in each of the plurality of pixels; and
the metal layer constitutes one of the pair of electrodes.

7. The liquid crystal display device of claim 6, wherein,
a transistor is formed in each of the plurality of pixels;
the reflective layer is electrically connected to a source electrode or a drain electrode of the transistor; and
the pair of electrodes are constituted by the metal layer and the reflective layer.

8. The liquid crystal display device of claim 1, wherein the surface of the reflective layer includes a plurality of recesses formed in accordance with a cross-sectional shape of the metal layer, and, regarding distance between two adjacent recesses among the plurality of recesses, a shortest distance is no less than 0.3 μm and no more than 3.0 μm.

9. The liquid crystal display device of claim 1, wherein,
a transistor is formed in each of the plurality of pixels; and
the metal layer is made of a same material as a gate electrode of the transistor, and the reflective layer is made of a same material as a source electrode or a drain electrode of the transistor.

10. The liquid crystal display device having a plurality of pixels, and comprising,
in each of the plurality of pixels, a reflection section for reflecting incident light toward a display surface, wherein,
the reflection section includes a metal layer having a plurality of apertures, and a reflective layer formed on the metal layer with an insulating layer interposed therebetween;
a surface of the reflective layer includes a plurality of recesses or protrusions formed in accordance with a cross-sectional shape of the metal layer;
regarding distance between two adjacent apertures among the plurality of apertures of the metal layer, a shortest distance is no less than 0.3 μm and no more than 3.0 μm; and
wherein, a semiconductor layer having a recess or aperture is formed between the insulating layer and the reflective layer in the reflection section; and the surface of the reflective layer has a recess or protrusion formed in accordance with a cross-sectional shape of the semiconductor layer.

11. The liquid crystal display device of claim 10, wherein a side face of the recess or protrusion formed on the surface of the reflective layer has a level difference which is formed in accordance with a cross-sectional shape of the metal layer and the semiconductor layer.

12. The liquid crystal display device having a plurality of pixels, and comprising,
in each of the plurality of pixels, a reflection section for reflecting incident light toward a display surface, wherein,
the reflection section includes a metal layer having a plurality of apertures, and a reflective layer formed on the metal layer with an insulating layer interposed therebetween;
a surface of the reflective layer includes a plurality of recesses or protrusions formed in accordance with a cross-sectional shape of the metal layer;.
regarding distance between two adjacent apertures among the plurality of apertures of the metal layer, a shortest distance is no less than 0.0 μm and no more than 3.0 μm; and further comprising:
a liquid crystal layer, an interlayer insulating layer and a pixel electrode; wherein the pixel electrode wherein the pixel electrode interposed between the liquid crystal layer and the reflective layer, wherein a surface of the pixel electrode facing the liquid crystal layer is formed flat without conforming to a shape of the recess or protrusion of the reflective layer.

13. A production method for a liquid crystal display device having a plurality of pixels and including, in each of the plurality of pixels, a reflection section for reflecting incident light toward a display surface, the production method comprising the steps of:
forming a metal film on a substrate;
forming a resist layer on the metal film;
removing a portion of the resist layer;
performing an etching via the resist layer, thereby patterning the metal film to form a metal layer; and
forming a reflective layer on the metal layer, wherein,
in the step of forming the metal layer, the metal layer is formed so that a plurality of apertures are formed in the metal layer in the reflection section, and regarding distance between two adjoining apertures among the plurality of apertures, a shortest distance is no less than 0.3 μm and no more than 3.0 μm: and
in the step of forming the metal layer, the metal layer is formed so that the metal layer in the reflection section includes a plurality of main portions and a linking portion connecting the plurality of main portions, and that a minimum value of width of the linking portion is no less than 0.3 μm and no more than 3.0 μm.

14. The production method of claim 13, wherein, in the step of forming the reflective layer, a plurality of recesses or protrusions are formed on a surface of the reflective layer in accordance with a cross-sectional shape of the metal layer.

15. The production method of claim 13, wherein,
a transistor is formed in each of the plurality of pixels;
a gate electrode of the transistor is formed in the step of forming the metal layer; and
in the step of forming the reflective layer, a source electrode and a drain electrode of the transistor are formed.

16. The production method for a liquid crystal display device having a plurality of pixels and including, in each of the plurality of pixels, a reflection section for reflecting incident light toward a display surface, the production method comprising the step of:
forming a metal film on a substrate;
forming a resist layer on the metal film;
removing a portion of the resist layer;
performing an etching via the resist layer, thereby patterning the metal film to form a metal layer; and
forming a reflective layer on the metal layer, wherein,
in the step of forming the metal layer, the metal layer is formed so that a plurality of apertures are formed in the metal layer in the reflection section, and regarding distance between two adjacent apertures among the plurality of apertures, a shortest distance is no less than 0.3 μm and no more than 3.0 μm; and
wherein, in the step of removing a portion of the resist layer, a plurality of apertures are formed in the resist layer as the resist layer is removed; and
regarding distance between two adjacent apertures among the plurality of apertures in the resist layer, a shortest distance is no less than 0.3 μm and no more than 3.0 μm.

17. The production method for a liquid crystal display device having a plurality of pixels and including, in each of the plurality of pixels, a reflection section of reflecting incident light toward a display surface the production method comprising the steps of:

forming a metal film on a substrate;

forming a resist layer on the metal film;

removing a portion of the resist layer;

performing an etching via the resist layer, thereby patterning the metal film to form a metal layer; and forming a reflective layer on the metal layer, wherein, in the step of forming the metal layer, the metal layer is formed so that a plurality of apertures are formed in the metal layer in the reflection section, and regarding distance between two adjacent apertures among the plurality of apertures, a shortest distance is no less than 0.3 µm and no more than 3.0 µm; and forming a semiconductor layer between an insulating layer and the reflective layer in the reflection section, the semiconductor layer having a recess or aperture, wherein, in the step of forming the reflective layer, a recess or protrusion is formed on a surface of the reflective layer in accordance with a cross-sectional shape of the semiconductor layer.

* * * * *